US011613373B2

(12) United States Patent
Chilukuri et al.

(10) Patent No.: US 11,613,373 B2
(45) Date of Patent: Mar. 28, 2023

(54) NOZZLE FOR A THERMAL ANTI-ICING SYSTEM

(71) Applicant: Rohr, Inc., Chula Vista, CA (US)

(72) Inventors: Radhakrishna Chilukuri, San Diego, CA (US); Yuvaraj Patil, Bangalore (IN); Ashok Babu Saya, Bangalore (IN); Vanukuri Venkatareddy, Bangalore (IN)

(73) Assignee: Rohr, Inc., Chula Vista, CA (US)

( * ) Notice: Subject to any disclaimer, the term of this patent is extended or adjusted under 35 U.S.C. 154(b) by 76 days.

(21) Appl. No.: 17/200,094

(22) Filed: Mar. 12, 2021

(65) Prior Publication Data

US 2021/0284351 A1 Sep. 16, 2021

(30) Foreign Application Priority Data

Mar. 13, 2020 (IN) .............................. 202011010910

(51) Int. Cl.
*F02C 7/047* (2006.01)
*B64D 33/02* (2006.01)

(52) U.S. Cl.
CPC .............. *B64D 33/02* (2013.01); *F02C 7/047* (2013.01); *B64D 2033/0233* (2013.01)

(58) Field of Classification Search
CPC .. B64D 33/02; B64D 2033/0233; F02C 7/047
See application file for complete search history.

(56) References Cited

U.S. PATENT DOCUMENTS

| | | | |
|---|---|---|---|
| 3,834,157 A | 9/1974 | Hoffmann | |
| 4,688,745 A | 8/1987 | Rosenthal | |
| 4,757,963 A | 7/1988 | Cole | |
| 5,011,098 A | 4/1991 | McLaren | |
| RE36,215 E | 6/1999 | Rosenthal | |
| 6,131,855 A | 10/2000 | Porte | |
| 6,267,328 B1 | 7/2001 | Vest | |
| 6,354,538 B1 | 3/2002 | Chilukuri | |
| 6,702,233 B1 | 3/2004 | DuPont | |
| 7,159,383 B2 | 1/2007 | Barton | |

(Continued)

FOREIGN PATENT DOCUMENTS

FR 2953254 B1 1/2012

OTHER PUBLICATIONS

Ji et al. "Prediction of Fully Developed Turbulent Heat Transfer or Internal Helically Ribbed Tubes—an Extension of Gnielinski Equation", International Journal of Heat and Mass Transfer 55, 2012, p. 1375-1384.

(Continued)

*Primary Examiner* — Steven M Sutherland
(74) *Attorney, Agent, or Firm* — Getz Balich LLC

(57) ABSTRACT

An assembly is provided for an aircraft propulsion system. The assembly includes a nacelle inlet structure with an internal cavity. The assembly also includes a nozzle configured to direct fluid into the internal cavity through a plurality of ports that include one or more first ports and at least one second port. The nozzle includes a trunk conduit, a first branch conduit and a second branch conduit. The first branch conduit and the second branch conduit are fluidly coupled in parallel to the trunk conduit. The first branch conduit includes the first port(s). The second branch conduit includes the second port.

18 Claims, 17 Drawing Sheets

(56) References Cited

U.S. PATENT DOCUMENTS

| | | |
|---|---|---|
| 7,291,815 B2 | 11/2007 | Hubert |
| 7,588,212 B2 | 9/2009 | Moe |
| 8,061,657 B2 | 11/2011 | Rocklin |
| 8,413,930 B2 | 4/2013 | Gregory |
| 8,757,547 B2 | 6/2014 | Porte |
| 9,403,599 B2 | 8/2016 | Binks |
| 9,488,067 B2 | 11/2016 | Johnson |
| 9,494,050 B2 | 11/2016 | Schnoebelen |
| 10,138,811 B2 | 11/2018 | Gally |
| 10,393,020 B2 | 8/2019 | Frank |
| 11,002,188 B2 | 5/2021 | Chilukuri |
| 2002/0027180 A1 | 3/2002 | Porte |
| 2009/0108134 A1 | 4/2009 | Thodiyil |
| 2010/0163677 A1 | 7/2010 | Rocklin |
| 2015/0086333 A1 | 3/2015 | Schnoebelen |
| 2015/0198061 A1 | 7/2015 | Johnson |
| 2015/0260099 A1 | 9/2015 | Gally |
| 2015/0260104 A1 | 9/2015 | Wilson |
| 2015/0291284 A1 | 10/2015 | Victor |
| 2015/0314882 A1 | 11/2015 | Lumbab |
| 2015/0367395 A1 | 12/2015 | Ludlow |
| 2016/0024963 A1 | 1/2016 | Lumbab |
| 2017/0057643 A1 | 3/2017 | Frank |
| 2017/0058772 A1 | 3/2017 | Frank |
| 2017/0259926 A1* | 9/2017 | Anderson ............. B64D 15/04 |
| 2017/0314412 A1 | 11/2017 | Tiwari |
| 2020/0032709 A1 | 1/2020 | Chilukuri |

OTHER PUBLICATIONS

EP search report for EP21162319.4 dated Aug. 4, 2021.

\* cited by examiner

NOZZLE FOR A THERMAL ANTI-ICING SYSTEM

This application claims priority to Indian Patent Appln. No. 202011010910 filed Mar. 13, 2020, which is hereby incorporated herein by reference in its entirety.

BACKGROUND

1. Technical Field

This disclosure relates generally to a thermal anti-icing system and, more particularly, to a nozzle for injecting fluid within an aircraft propulsion system.

2. Background Information

A nacelle for an aircraft propulsion system may include an anti-icing system for reducing/preventing ice accumulation on an inlet lip of the nacelle. Various types and configurations of anti-icing systems are known in the art and have various benefits. A typical anti-icing system includes a nozzle for injecting compressor bleed air into a cavity (e.g., a D-duct) within the inlet lip. Various types and configurations of such nozzles are known in the art. While these known nozzles have various benefits, there is still room in the art for improvement. In particular, there is room in the art for an improved nozzle capable of reducing hot spots on and increasing heating of an inner lip skin of the inlet lip.

SUMMARY OF THE DISCLOSURE

According to an aspect of the present disclosure, an assembly is provided for an aircraft propulsion system. This assembly includes a nacelle inlet structure with an internal cavity. The assembly also includes a nozzle configured to direct fluid into the internal cavity through a plurality of ports that include a plurality of first ports and a second port. The nozzle includes a trunk conduit, a first branch conduit and a second branch conduit. The first branch conduit and the second branch conduit are fluidly coupled in parallel to the trunk conduit. The first branch conduit includes the first ports. The second branch conduit includes the second port.

According to another aspect of the present disclosure, another assembly is provided for an aircraft propulsion system. This assembly includes an anti-icing system that includes a nozzle configured to direct fluid into a cavity through a plurality of ports. The ports include a first port and a second port. The nozzle includes a trunk conduit, a first branch conduit and a second branch conduit. The first branch conduit and the second branch conduit are each independently fluidly coupled to the trunk conduit. The first branch conduit includes the first port. A first branch centerline of the first branch conduit is parallel with a trunk centerline of the trunk conduit at least at an interface between the first branch conduit and the trunk conduit. The second branch conduit includes the second port.

According to still another aspect of the present disclosure, another assembly is provided for an aircraft propulsion system. This assembly includes nacelle inlet structure with an internal cavity. The assembly also includes a nozzle configured to direct fluid into the internal cavity through a plurality of ports. A first of the ports has a first flow area with a first diameter. The first of the ports is located a first distance to an outer lip skin of the nacelle inlet structure along a first port centerline. A second of the ports has a second flow area with a second diameter. The second of the ports is located a second distance to the outer lip skin of the nacelle inlet structure along a second port centerline. The first distance is different than the second distance. A first quotient of the first distance divided by the first diameter is substantially equal to a second quotient of the second distance divided by the second diameter.

The first diameter may be a first hydraulic diameter. The second diameter may be a second hydraulic diameter.

The nozzle may include a trunk conduit, a first branch conduit and a second branch conduit. The first branch conduit and the second branch conduit may be fluidly coupled in parallel to the trunk conduit. The first branch conduit may include at least the first of the ports. The second branch conduit may include at least the second of the ports.

The first branch conduit may extend out from the trunk conduit along a first branch centerline to a first closed end. The second branch conduit may extend out from the trunk conduit along a second branch centerline to a second closed end.

The first branch conduit may extend along a first branch centerline. The second branch conduit may extend along a second branch centerline. At least a first major portion of the first branch centerline may be parallel with at least a second major portion of the second branch centerline.

The first branch conduit may extend along a first branch centerline that is coaxial with a trunk centerline of the trunk conduit at least at an interface between the first branch conduit and the trunk conduit.

The second branch conduit may extend along a second branch centerline that is angularly offset from a trunk centerline of the trunk conduit by an angle at least at an interface between the second branch conduit and the trunk conduit.

The first branch conduit may have a first longitudinal length. The second branch conduit may have a second longitudinal length that is less than the first longitudinal length.

The nacelle inlet structure may include an inner lip skin. The second branch conduit may be located radially between the first branch conduit and the inner lip skin relative to an axis of the nacelle inlet structure.

The first branch conduit may have a first cross-sectional area at a first interface between the first branch conduit and the trunk conduit. The second branch conduit may have a second cross-sectional area at a second interface between the second branch conduit and the trunk conduit. The first cross-sectional area may be greater than the second cross-sectional area.

The nacelle inlet structure may extend circumferentially around an axis. An angle between a centerline of one of the ports and a ray extending out from the axis may be an acute angle. The one of the ports may be any of the ports including, but not limited to, one of the first ports or the second port.

The nacelle inlet structure may extend circumferentially around an axis. An angle between a centerline of one of the ports and a ray extending out from the axis may be a right angle. The one of the ports may be any of the ports including, but not limited to, one of the first ports or the second port.

Each of the ports may have an equal flow area.

One of the ports may have a different flow area than any other one of the ports. The one of the ports may be any of the ports including, but not limited to, one of the first ports or the second port.

A first of the ports (e.g., one of the first or second ports) may have a first diameter and a first distance (e.g., in a direction along a centerline of the first of the ports) to an outer lip skin of the nacelle inlet structure. A second of the ports (e.g., one of the first or second ports) may have a second diameter and a second distance (e.g., in a direction along a centerline of the second of the ports) to an outer lip skin of the nacelle inlet structure. The first distance may be different than the second distance. A first quotient of the first distance divided by the first diameter may be at least substantially, or exactly, equal to a second quotient of the second distance divided by the second diameter.

The first branch conduit may include a first quantity of the ports; e.g., the first ports. The second branch conduit may include a second quantity of the ports that is different than the first quantity of the ports; e.g., the second port(s).

The second port may be one of a plurality of second ports configured with the second branch conduit.

A first flow area of the first branch conduit may decrease as the first branch conduit extends longitudinally along a first branch centerline. A second flow area of the second branch conduit may also or alternatively decrease as the second branch conduit extends longitudinally along a second branch centerline.

A port centerline of the second port may not be coincident with a second branch centerline of the second branch conduit.

The second branch conduit may include a first portion and a second portion. The first portion may connect the second portion to the trunk conduit. The second portion may be angularly offset from the first portion by an angle.

The foregoing features and the operation of the invention will become more apparent in light of the following description and the accompanying drawings.

DETAILED DESCRIPTION

Figure 1:
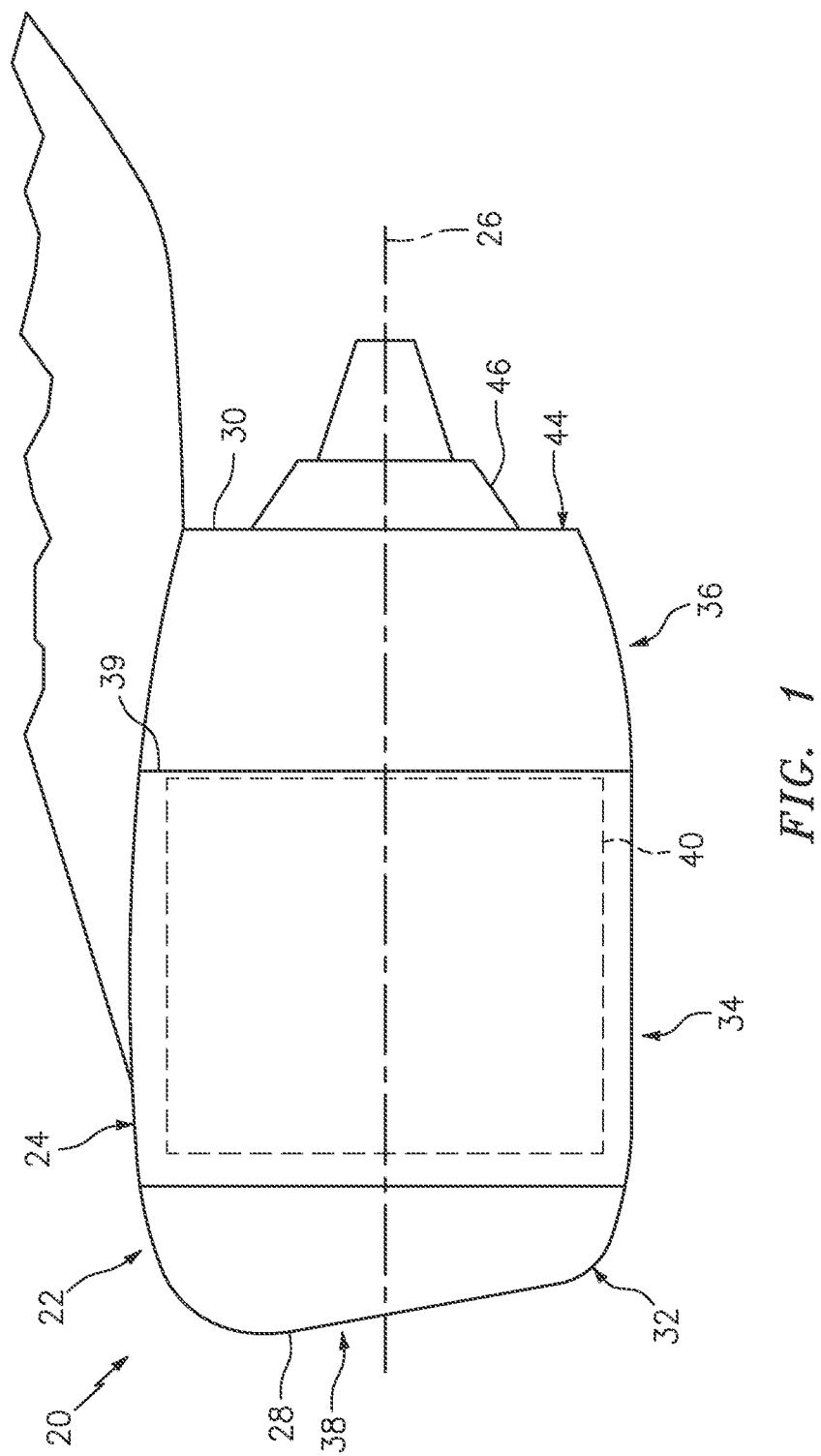
FIG. 1 is a side illustration of an aircraft propulsion system.

FIG. 1 illustrates an aircraft propulsion system 20 for an aircraft such as, but not limited to, a commercial airliner or a cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. An outer structure 24 of the nacelle 22 extends along a rotational axis 26 (e.g., a centerline axis) of the gas turbine engine between a nacelle forward end 28 and a nacelle aft end 30. The outer structure 24 of FIG. 1 includes a nacelle inlet structure 32, one or more fan cowls 34 (one such cowl visible in FIG. 1) and a nacelle aft structure 36, which may be configured as part of or include a thrust reverser system.

As described below in further detail, the inlet structure 32 is disposed at the nacelle forward end 28. The inlet structure 32 is configured to direct a stream of air through an inlet opening 38 (see also FIG. 2) at the nacelle forward end 28 and into a fan section of the gas turbine engine.

The fan cowls 34 are disposed axially between the inlet structure 32 and the aft structure 36. Each fan cowl 34 of FIG. 1, in particular, is disposed at an aft end 39 of a stationary portion of the nacelle 22, and extends forward to the inlet structure 32. Each fan cowl 34 is generally axially aligned with a fan section of the gas turbine engine. The fan cowls 34 are configured to provide an aerodynamic covering for a fan case 40, which circumscribes the fan section and may partially form an outer peripheral boundary of a flowpath 42 (see FIG. 2) of the propulsion system 20.

The term "stationary portion" is used above to describe a portion of the nacelle 22 that is stationary during propulsion system 20 operation (e.g., during takeoff, aircraft flight and landing). However, the stationary portion may be otherwise movable for propulsion system 20 inspection/maintenance; e.g., when the propulsion system 20 is non-operational. Each of the fan cowls 34, for example, may be configured to provide access to components of the gas turbine engine such as the fan case 40 and/or peripheral equipment configured therewith for inspection, maintenance and/or otherwise. In particular, each of the fan cowls 34 may be pivotally mounted with the aircraft propulsion system 20 by, for example, a pivoting hinge system. The present disclosure, of course, is not limited to the foregoing fan cowl configurations and/or access schemes.

The aft structure 36 of FIG. 1 is disposed at the nacelle aft end 30. The aft structure 36 is configured to form a bypass nozzle 44 for the flowpath 42 (see FIG. 2) with an inner structure 46 of the nacelle 22; e.g., an inner fixed structure (IFS). The aft structure 36 may include one or more translating sleeves (one such sleeve visible in FIG. 1) for the thrust reverser system. The present disclosure, however, is not limited to such a translating sleeve thrust reverser system, or to an aircraft propulsion system 20 with a thrust reverser system.

Figure 2:
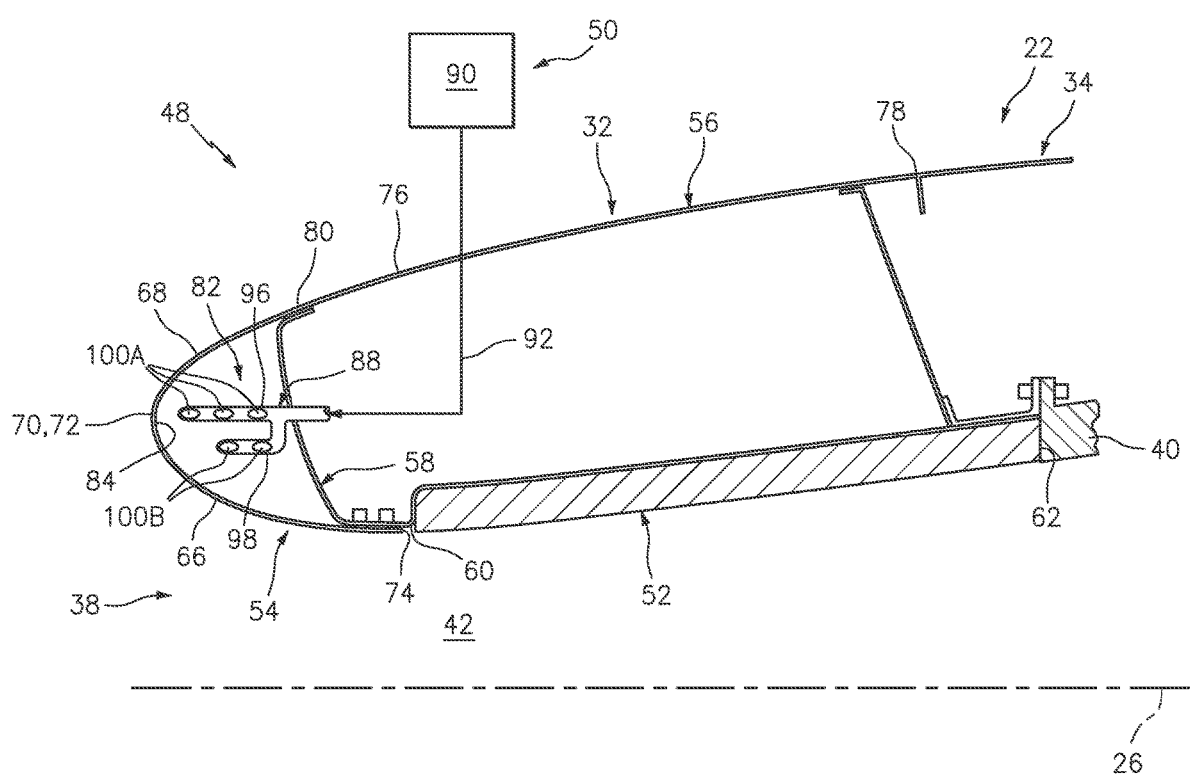
FIG. 2 is a partial side sectional illustration of an assembly for the aircraft propulsion system with a portion of a thermal anti-icing system schematically shown.

FIG. 2 is a schematic side sectional illustration of an assembly 48 of the propulsion system 20 of FIG. 1. This propulsion system assembly 48 includes the inlet structure 32, the fan cowls 34 (one shown) and the fan case 40. The propulsion system assembly 48 also includes a thermal anti-icing system 50.

The inlet structure 32 in FIG. 2 includes a tubular inner barrel 52, an annular inlet lip 54 (e.g., nose lip), a tubular outer barrel 56 and at least one forward (e.g., annular) bulkhead 58. The inlet structure 32 of FIG. 2 also configured with one or more components of the thermal anti-icing system 50.

The inner barrel 52 extends circumferentially around the rotational axis 26. The inner barrel 52 extends axially along the rotational axis 26 between an inner barrel forward end 60 and an inner barrel aft end 62. The inner barrel 52 may be configured to attenuate noise generated during propulsion system 20 operation and, more particularly for example, noise generated by rotation of a fan in the fan section. The inner barrel 52 of FIG. 2, for example, includes at least one tubular acoustic panel or an array of arcuate acoustic panels arranged around the rotational axis 26. Each acoustic panel may include a porous (e.g., honeycomb) core bonded between a perforated face sheet and a non-perforated back sheet, where the perforated face sheet faces radially inward and provides an outer boundary for an axial portion of the flowpath 42. Of course, various other acoustic panel types and configurations are known in the art, and the present disclosure is not limited to any particular ones thereof.

The inlet lip 54 forms a leading edge 64 of the nacelle 22 as well as the inlet opening 38 to the fan section of the gas turbine engine. The inlet lip 54 has a cupped (e.g., generally U-shaped) cross-sectional geometry, which extends circumferentially as an annular body around the rotational axis 26. The inlet lip 54 includes an inner lip skin 66 and an outer lip skin 68, which skins 66 and 68 may be formed together from a generally contiguous sheet material. Examples of such sheet material include, but are not limited to, metal (e.g., aluminum (Al) or titanium (Ti) sheet metal).

The inner lip skin 66 extends axially from an intersection 70 with the outer lip skin 68 at the nacelle forward end 28 to the inner barrel 52, which intersection 70 may be at an axially forward most point 72 on the inlet lip 54. An aft end 74 of the inner lip skin 66 is attached to the forward end 60 of the inner barrel 52 with, for example, one or more fasteners; e.g., rivets, bolts, etc. Of course, the present disclosure is not limited to any particular attachment techniques between the inlet lip 54 and the inner barrel 52.

The outer lip skin 68 extends axially from the intersection 70 with the inner lip skin 66 at the nacelle forward end 28 to the outer barrel 56.

The outer barrel 56 has a tubular outer barrel skin 76 that extends circumferentially around the rotational axis 26. The outer barrel skin 76 extends axially along the rotational axis 26 between the inlet lip 54 and, more particularly, the outer lip skin 68 and an aft end 78 of the outer barrel 56.

The outer barrel 56 and its skin 76 may be formed integrally with the outer lip skin 68 and, more particularly, the entire inlet lip 54 as shown in FIG. 2. The inlet lip 54 and the outer barrel 56, for example, may be formed from a monolithic exterior skin such as, for example, a formed piece of sheet metal. Such a monolithic exterior skin may extend longitudinally from the aft end 74 of the inner lip skin 66 to the aft end 78 of the outer barrel 56. This monolithic exterior skin therefore integrally includes the inner lip skin 66, the outer lip skin 68 as well as the outer barrel skin 76. In such embodiments, the monolithic skin may be formed as a full hoop body, or circumferentially segmented into arcuate (e.g., circumferentially extending) bodies which are attached in a side-by-side fashion circumferentially about the rotational axis 26. The present disclosure, however, is not limited to such exemplary configurations. For example, in other embodiments, the inlet lip 54 may be formed discrete from the outer barrel 56 where the outer lip skin 68 is discrete from the outer barrel skin 76. In such embodiments, the outer lip skin 68 may meet the outer barrel skin 76 at an interface with the forward bulkhead 58 at, for example, a point 80.

The forward bulkhead 58 is configured with the inlet lip 54 to form a forward internal cavity 82 (e.g., annular D-duct) within the inlet lip 54. The forward bulkhead 58 of FIG. 2, in particular, is axially located approximately at (e.g., proximate, adjacent or on) the aft end 74 of the inlet lip 54. The forward bulkhead 58 may be configured as a substantially annular body, which may be continuous or circumferentially segmented. The forward bulkhead 58 is attached to and extends radially between the inner lip skin 66 and the outer lip skin 68. The forward bulkhead 58 may be mechanically fastened to the inlet lip 54 with one or more fasteners. The forward bulkhead 58 may also or alternatively be bonded and/or otherwise connected to the inlet lip 54.

Figure 3:
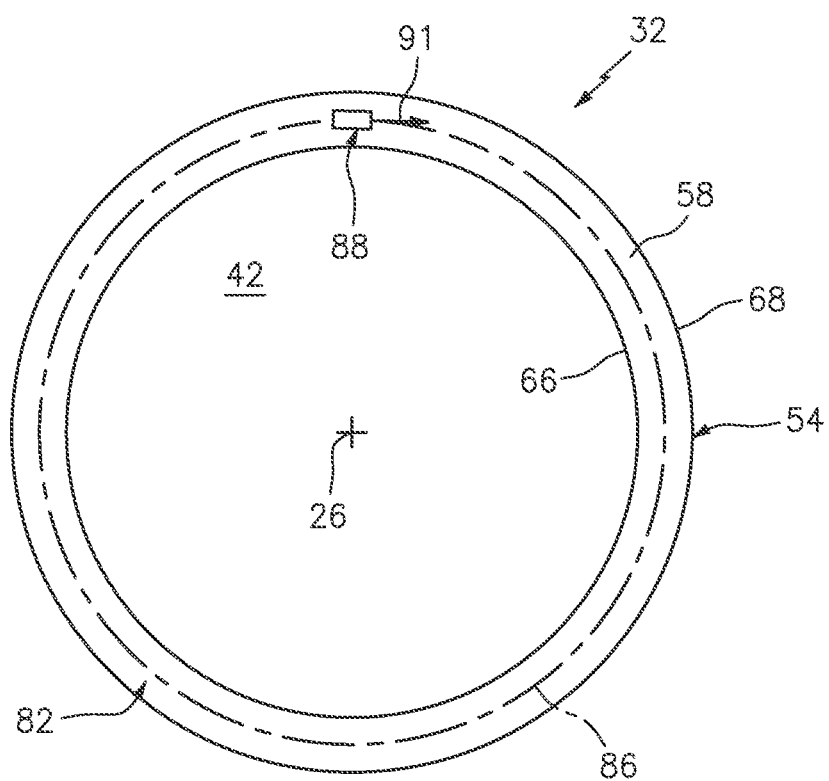
FIG. 3 is a schematic cross-sectional illustration of the aircraft propulsion system assembly.

The cavity 82 extends axially within the inlet lip 54 from a forward end 84 of the inlet lip 54 (e.g., at the point 72) to the forward bulkhead 58. The cavity 82 extends radially within the inlet lip 54 from the inner lip skin 66 to the outer lip skin 68. Referring to FIG. 3, the cavity 82 also extends circumferentially about (e.g., completely around) the rotational axis 26. More particularly, the cavity 82 of FIG. 3 extends along a curvilinear centerline 86 of the cavity 82 within the inlet lip 54, which curvilinear centerline 86 extends circumferentially about the rotational axis 26.

Referring to FIG. 2, the thermal anti-icing system 50 is configured to melt and/or prevent ice accumulation on an exterior surface of an exterior skin of the inlet structure 32; e.g., exterior surfaces of the inner lip skin 66 and/or the outer lip skin 68. The thermal anti-icing system 50 of FIG. 2 includes at least one nozzle 88, a fluid source 90 and a supply conduit 92 for directing/routing fluid (e.g., relatively hot compressed bleed air) from the fluid source 90 to the nozzle 88. The fluid source 90 may be configured as a compressor section (e.g., a high pressure compressor (HPC) section or a low pressure compressor (LPC) section) of the gas turbine engine.

Figure 4:
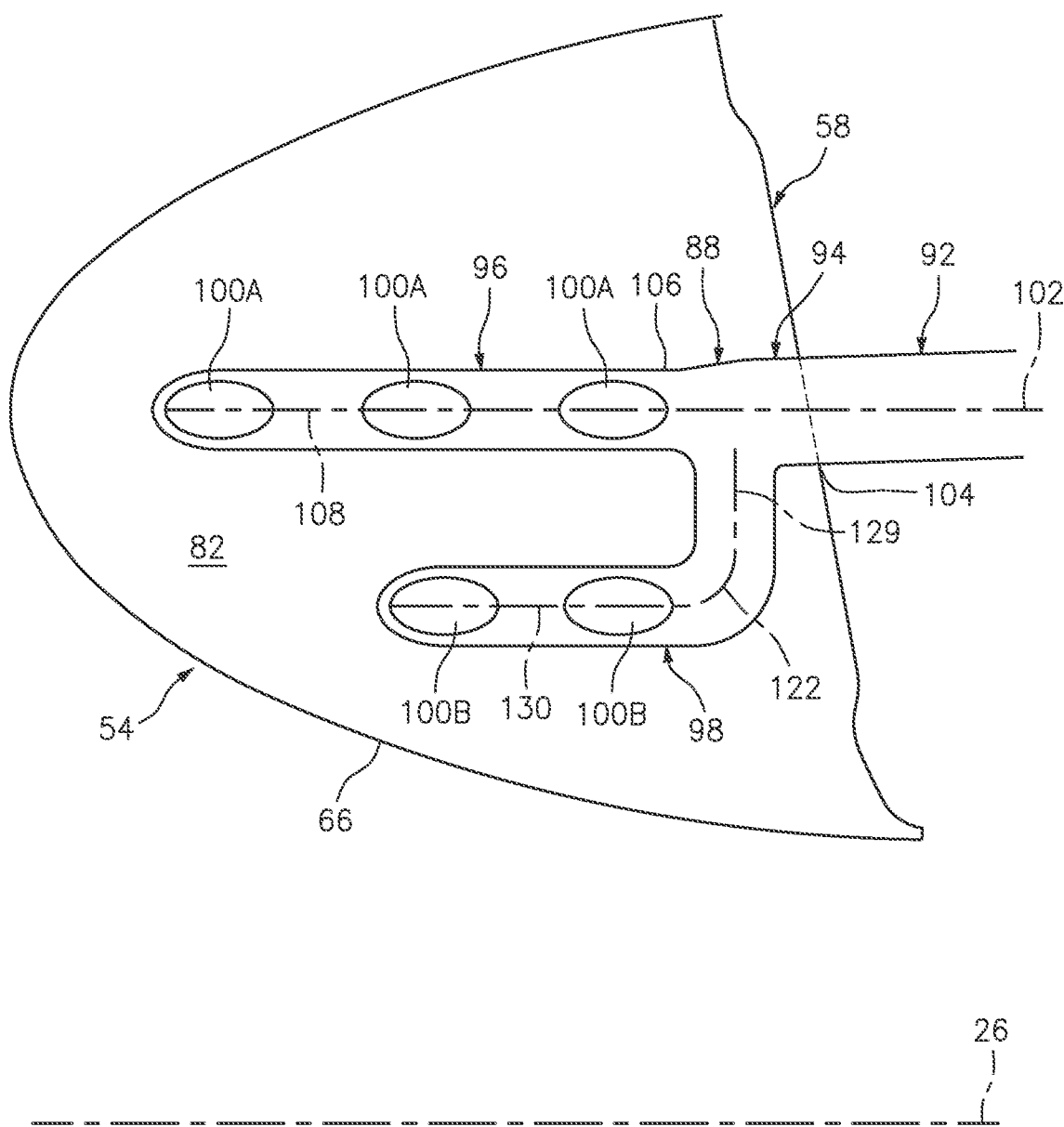
FIG. 4 is a side sectional illustration of a portion of the aircraft propulsion system assembly.

Referring to FIG. 4, the nozzle 88 is arranged at least partially (or completely) within the cavity 82. The nozzle 88 of FIG. 4, for example, projects generally axially along the rotational axis 26 into the cavity 82 from the forward bulkhead 58. The nozzle 88 is configured to inject the fluid received from the fluid source 90 into the cavity 82 in a general lateral direction; e.g., in a direction 91 approximately tangential to the curvilinear centerline 86 of FIG. 3.

The nozzle 88 may be configured as a forked nozzle; e.g., the nozzle 88 may have a generally saguaro shape. The nozzle 88 of FIGS. 5 and 6, for example, includes a trunk conduit 94 and a plurality of branch conduits 96 and 98 that project out (e.g., branch off) from the trunk conduit 94. The nozzle 88 also includes a plurality of nozzle ports 100A and 100B (generally referred to as "100") for injecting the fluid into the cavity 82.

Figure 5:
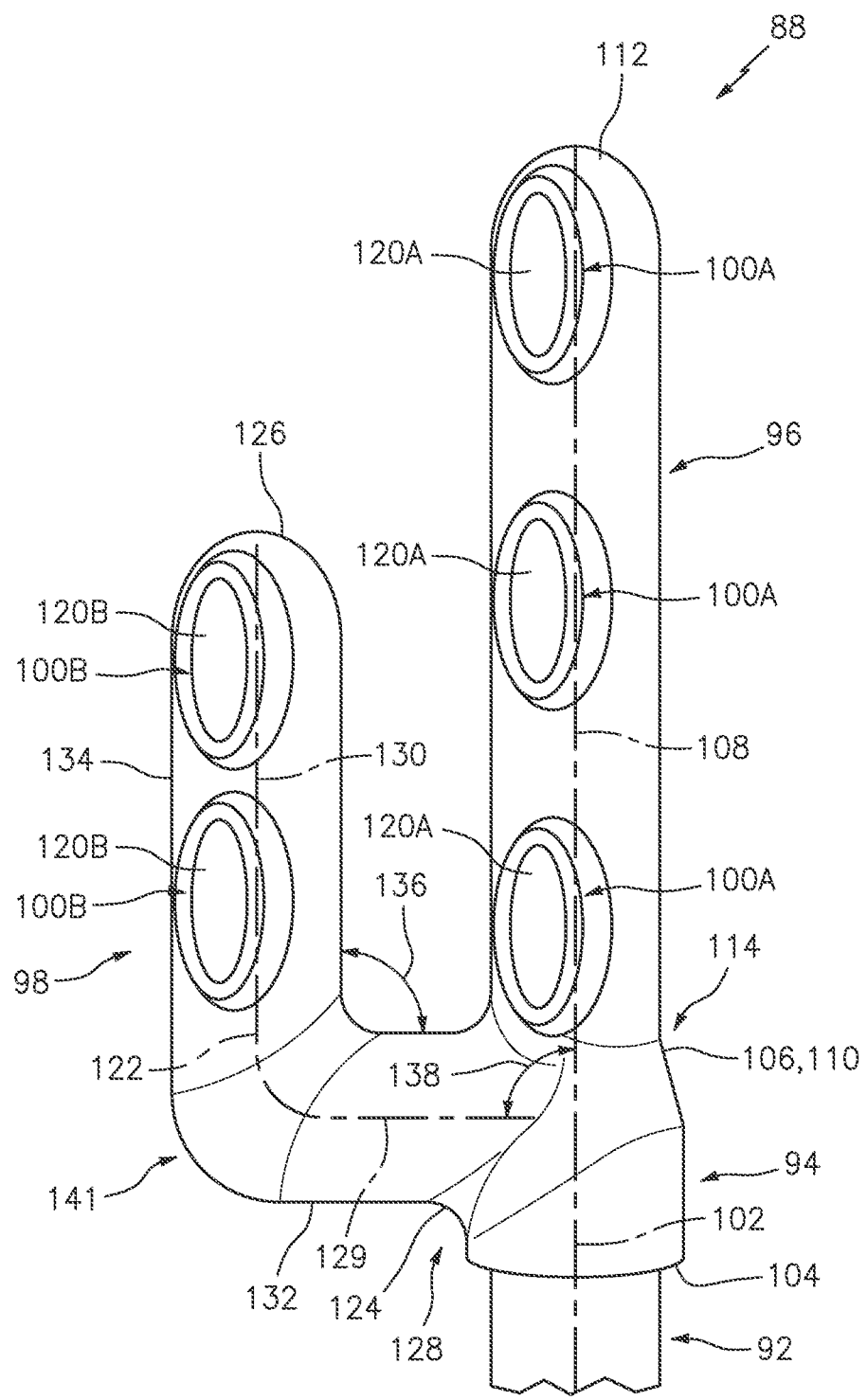
FIG. 5 is a front view illustration of a nozzle for the thermal anti-icing system.

Referring to FIG. 5, the trunk conduit 94 extends along a trunk centerline 102 between a trunk upstream end 104 and a trunk downstream end 106. The trunk upstream end 104 is fluidly coupled with the supply conduit 92. Referring to FIG. 4, the trunk upstream end 104 may be arranged at (e.g., on, adjacent or proximate) the forward bulkhead 58. The trunk conduit 94 may be connected (e.g., mounted) to the forward bulkhead 58. The trunk conduit 94 may thereby project along the trunk centerline 102 into the cavity 82 to the trunk downstream end 106.

Figure 7A:
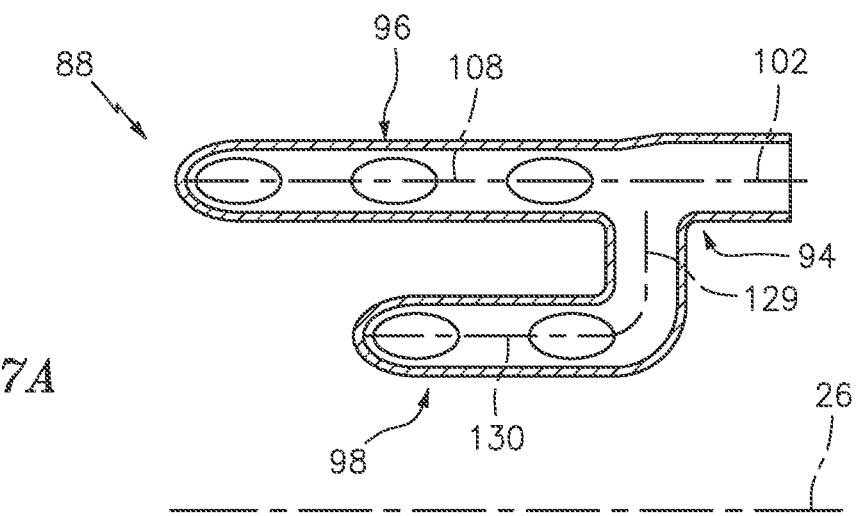
FIGS. 7A-7C are front view illustrations of the nozzle arranged in different orientations relative to a rotational axis of the aircraft propulsion system.
Figure 7B:
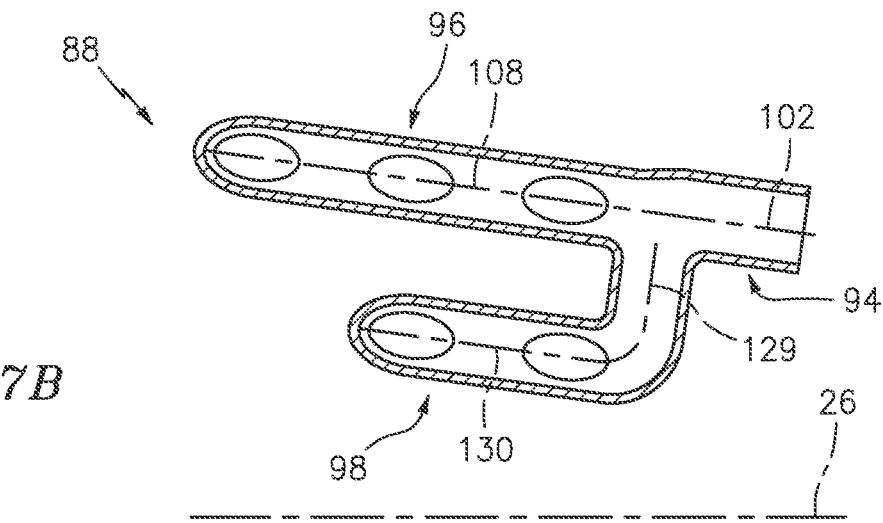
Figure 7C:
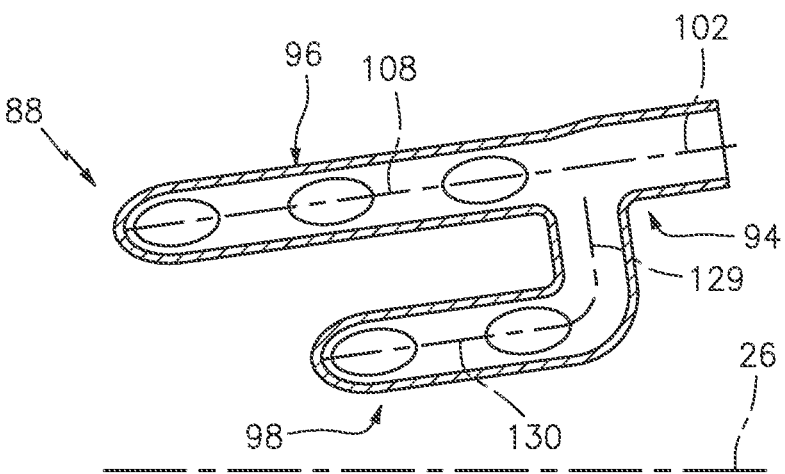

The trunk centerline 102 may be a straight line. Referring to FIG. 7A, the trunk centerline 102 may be arranged parallel with the rotational axis 26. Alternatively, referring to FIGS. 7B and 7C, the trunk centerline 102 may be axially offset from the rotational axis 26 by an acute angle; e.g., between one degree (1°) and thirty degrees (30°).

Referring to FIG. 4, the first (e.g., upper) branch conduit 96 is arranged radially (relative to the rotational axis 26) between the second (e.g., lower) branch conduit 98 and the outer lip skin 68. Referring to FIG. 5, the first branch conduit 96 extends along a first branch centerline 108 between a first branch upstream end 110 and a first branch downstream end 112. The first branch upstream end 110 is fluidly coupled with the downstream end 106 of the trunk conduit 94 at a first interface 114 between the first branch conduit 96 and the trunk conduit 94. The first branch downstream end 112 is configured as a closed end; e.g., a dead end/capped end.

The first branch centerline 108 may be a straight line. At least a portion the first branch centerline 108 at the first interface 114 (or an entirety of the first branch centerline 108) may be parallel with the trunk centerline 102. The first branch centerline 108 of FIG. 5, for example, is coaxial with the trunk centerline 102. Referring to FIG. 7A, the first branch centerline 108 may be arranged parallel with the rotational axis 26. Alternatively, referring to FIGS. 7B and 7C, the first branch centerline 108 may be axially offset from the rotational axis 26 by an acute angle; e.g., between one degree (1°) and fifteen degrees (15°).

Figure 8A:
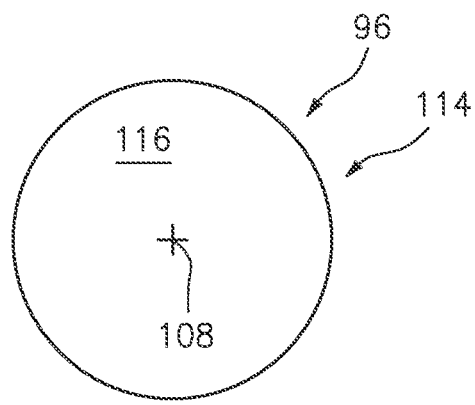
FIG. 8A is a schematic cross-sectional illustration of a first branch conduit of the nozzle.
Figure 8B:
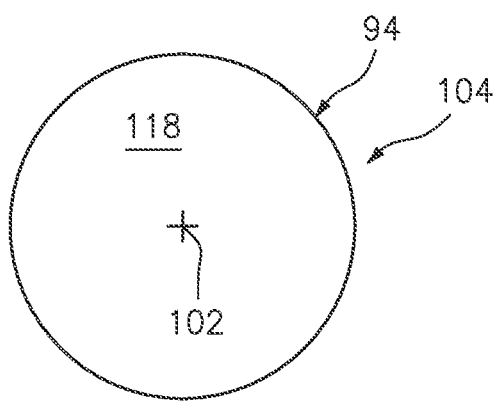
FIG. 8B is a schematic cross-sectional illustration of a trunk conduit of the nozzle.

Referring to FIG. 8A, the first branch conduit 96 has a first branch cross-sectional area 116 at the first interface 114. This first branch cross-sectional area 116 describes a measure of an area of an internal bore/passage through the first branch conduit 96 in a plane perpendicular to the first branch centerline 108. Referring to FIGS. 8A and 8B, the first branch cross-sectional area 116 is sized smaller than a trunk cross-sectional area 118 of the trunk conduit 94 at, for example, the trunk upstream end 104. This trunk cross-sectional area 118 describes a measure of an area of an internal bore/passage through the trunk conduit 94 in a plane perpendicular to the first branch centerline 108. Thus, the first branch conduit 96 is configured to flow less fluid than the trunk conduit 94. Of course, in other embodiments, the first branch cross-sectional area 116 may be equal to the trunk cross-sectional area 118.

Figure 6:
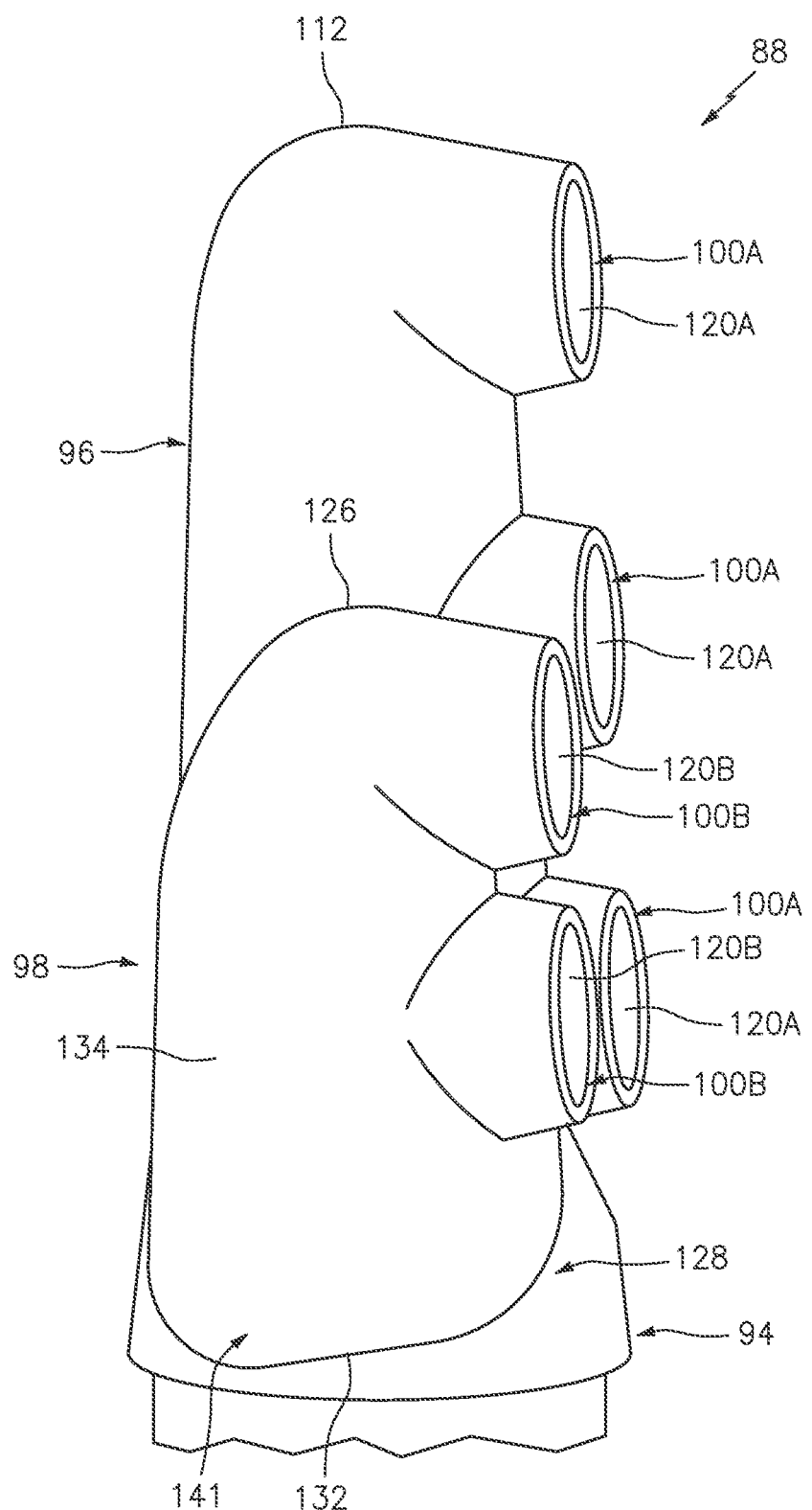
FIG. 6 is a side view illustration of the nozzle.

Referring to FIGS. 5 and 6, the first branch conduit 96 is configured with one or more of the nozzle ports 100; e.g., one or more first ports 100A. These first ports 100A are arranged longitudinally along the first branch centerline 108. One of the first ports 100A, for example, is arranged at (e.g., on, adjacent or proximate) the first interface 114. One of the first ports 100A is arranged at the first branch downstream end 112. One of the first ports 100A is arranged longitudinally between the other first ports 100A.

The first ports 100A are connected to a sidewall of the first branch conduit 96. Each of the first ports 100A and, more particularly, a nozzle orifice 120A of the respective first port 100A is fluidly coupled with the internal bore of the first branch conduit 96. Each of the first ports 100A is thereby operable to direct fluid from within the first branch conduit 96 into the cavity 82 (see FIG. 4).

Referring to FIG. 4, the second branch conduit 98 is arranged radially (relative to the rotational axis 26) between the first branch conduit 96 and the inner lip skin 66. Referring to FIG. 5, the second branch conduit 98 extends along a second branch centerline 122 between a second branch upstream end 124 and a second branch downstream end 126. The second branch upstream end 124 is fluidly coupled with the downstream end 106 of the trunk conduit 94 at a second interface 128 between the second branch conduit 98 and the trunk conduit 94. The second branch downstream end 126 is configured as a closed end; e.g., a dead end/capped end. With this configuration, first branch conduit 96 and the second branch conduit 98 are independently (e.g., directly) connected to and fluidly coupled in parallel to the trunk conduit 94.

The second branch centerline 122 may be a non-straight line; e.g., a curvilinear line and/or a compound line. The second branch centerline 122 of FIG. 5, for example, includes a first (e.g., straight) segment 129 and a second (e.g., straight) segment 130. The first segment 129 of the second branch centerline 122 and, thus, a corresponding first portion 132 of the second branch conduit 98 is angularly offset from the second segment 130 of the second branch centerline 122 and, thus, a corresponding second portion 134 of the second branch conduit 98 by an angle 136. This angle 136 may be a right angle; i.e., ninety degrees (90°). Alternatively, referring to FIG. 9, the angle 136 may be an obtuse angle (or still alternatively an acute angle). The angle 136 of FIG. 9, for example, is between one hundred degrees (100°) and one hundred and fifty degrees (150°); e.g., the angle 136 may be or about (e.g., +/−2°) one hundred and fifteen degrees (115°) or one hundred and ten degrees (110°). The present disclosure, however, is not limited to the foregoing exemplary angles.

Referring to FIG. 5, the first segment 129 of the second branch centerline 122 and, thus, the corresponding first portion 132 of the second branch conduit 98 is angularly offset from the trunk centerline 102 and, thus, the trunk conduit 94 by an angle 138. This angle 138 may be a right angle. Alternatively, referring to FIG. 9, the angle 138 may be an acute angle (or still alternatively an obtuse angle). The angle 138 of FIG. 9, for example, is between eighty degrees (80°) and thirty degrees (30°); e.g., the angle 138 may be or about (e.g., +/−2°) sixty-five degrees (65°) or seventy degrees (70°). The present disclosure, however, is not limited to the foregoing exemplary angles.

Referring to FIG. 5, the second segment 130 of the second branch centerline 122 and, thus, the corresponding second portion 134 of the second branch conduit 98 may be parallel with the first branch centerline 108 and/or the trunk centerline 102. In the embodiment of FIG. 5, the second portion 134 may be a major portion (e.g., at least 60-70%) of the second branch conduit 98. Referring to FIG. 7A, the second segment 130 of the second branch centerline 122 and the second portion 134 may be arranged parallel with the rotational axis 26. Alternatively, referring to FIGS. 7B and 7C, the second segment 130 of the second branch centerline 122 and the second portion 134 may be axially offset from the rotational axis 26 by an acute angle; e.g., between one degree (1°) and fifteen degrees (15°).

Figure 8C:
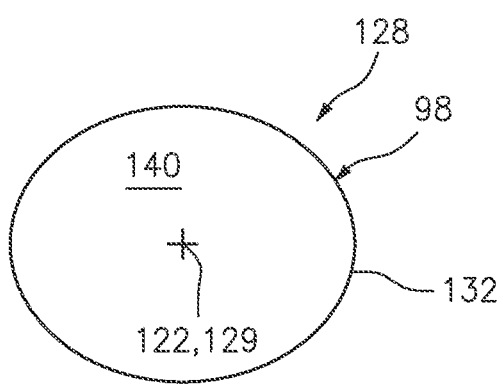
FIG. 8C is a schematic cross-sectional illustration of a second branch conduit of the nozzle.

Referring to FIG. 8C, the second branch conduit 98 has a second branch cross-sectional area 140 at the second interface 128. This second branch cross-sectional area 140 describes a measure of an area of an internal bore/passage through the second branch conduit 98 in a plane perpendicular to the second branch centerline 122. Referring to FIGS. 8B and 8C, the second branch cross-sectional area 140 is sized smaller than the trunk cross-sectional area 118 of the trunk conduit 94 at, for example, the trunk upstream end 104. Referring to FIGS. 8A and 8C, the second branch cross-sectional area 140 is also sized smaller than the first branch cross-sectional area 116 of the first branch conduit 96 at the first interface 114. Thus, the second branch conduit 98 is configured to flow less fluid than the first branch conduit 96 as well as the trunk conduit 94. Of course, in other embodiments, the second branch cross-sectional area 140 may be equal to the first branch cross-sectional area 116.

Referring to FIGS. 5 and 6, the second branch conduit 98 is configured with one or more of the nozzle ports 100; e.g., one or more second ports 100B. There second ports 100B are arranged longitudinally along the second branch centerline 122. One of the second ports 100B, for example, is arranged at (e.g., on, adjacent or proximate) a corner 141 between the first and second segments 128 and 130 of the second branch centerline 122. Another one of the second ports 100B is arranged at the second branch downstream end 126.

The second ports 100B are connected to a sidewall of the second branch conduit 98. Each of the second ports 100B and, more particularly, a nozzle orifice 120B of the respective second port 100B is fluidly coupled with the internal bore of the second branch conduit 98. Each of the second ports 100B is thereby operable to direct fluid from within the second branch conduit 98 into the cavity 82 (see FIG. 4).

Figure 10:
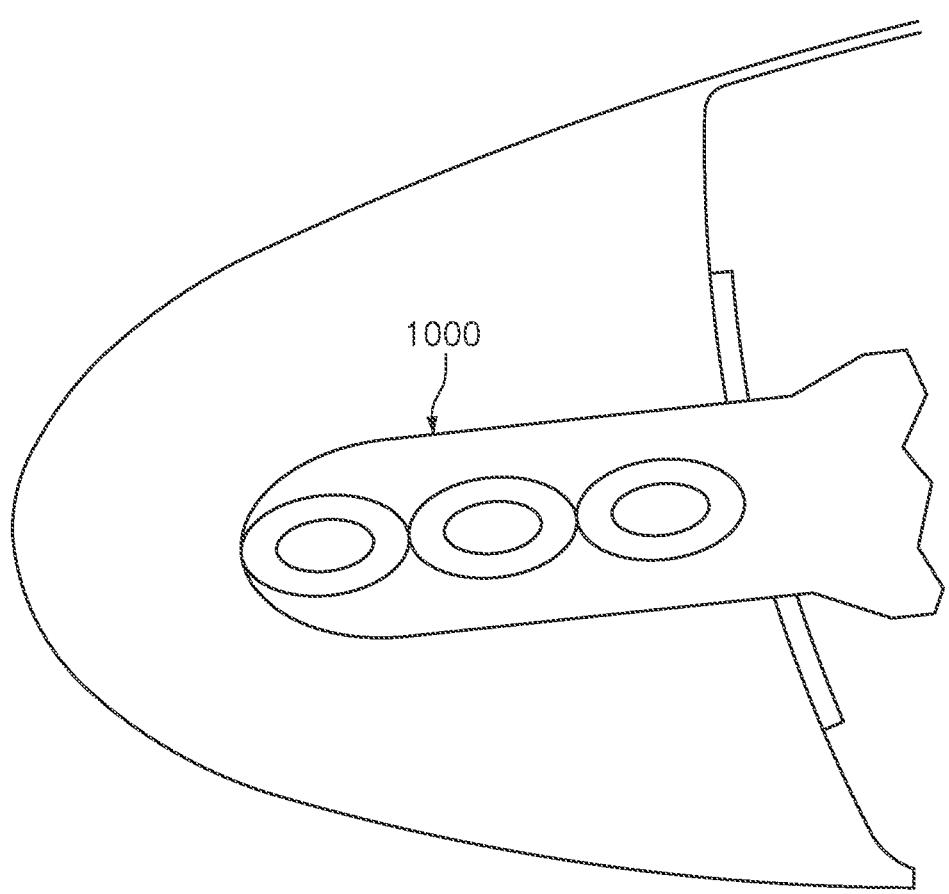
FIG. 10 is a partial side sectional illustration of another assembly for the aircraft propulsion system.

During operation of the thermal anti-ice system of FIGS. 2 and 3, the fluid (e.g., heated air) is injected generally laterally into the cavity 82 by the nozzle 88 and, more particularly, the first ports 100A and the second ports 100B (see also FIGS. 4-6). This injected fluid causes fluid within the cavity 82 (i.e., previously injected fluid) to flow circumferentially through the cavity 82 along the curvilinear centerline 86 thereby convectively heating the inlet lip 54. By splitting the nozzle ports 100 with the first branch conduit 96 and the second branch conduit 98, the nozzle ports 100 are relatively uniformly distributed across a cross-section of the cavity 82 (e.g., see FIG. 4). This enables a more uniform distribution of fluid from the nozzle 88 and, thus, a reduction of hotspots relative to a straight-line nozzle 1000 configuration as shown, for example, in FIG. 10. In addition, positioning the second branch conduit 98 between the first branch conduit 96 and the inner lip skin 66 enables a higher mass flow of the fluid proximate the inner lip skin 66 relative to the straight-line nozzle 1000 configuration of FIG. 10.

In some embodiments, referring to FIG. 5, a longitudinal length of the first branch conduit 96 along its centerline 108 between the ends 110 and 112 may be greater than a longitudinal length of the second branch conduit 98 along its centerline 122 between the ends 124 and 126. However, in other embodiments, the longitudinal lengths may be substantially equal as shown, for example, in FIG. 11. In still other embodiments, the longitudinal length of the second branch conduit 98 may be greater than the longitudinal length of the first branch conduit 96 as shown, for example, in FIG. 12.

Figure 11:
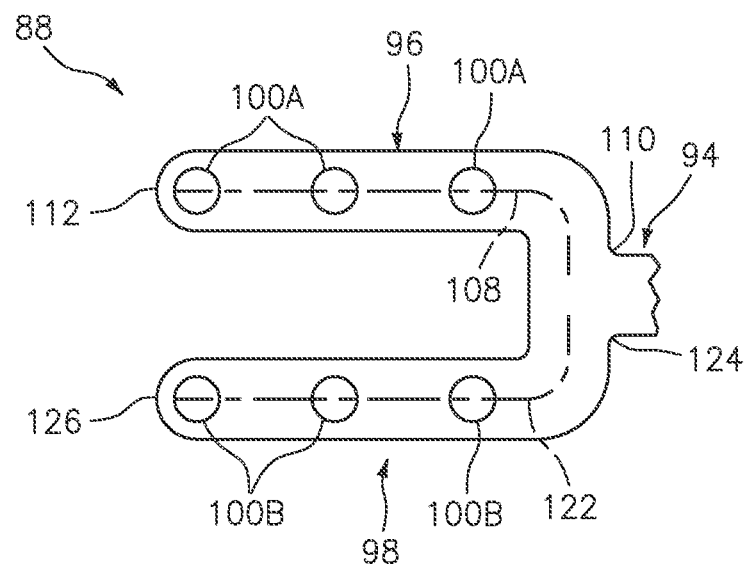
FIG. 11 is a front view illustration of another nozzle for the thermal anti-icing system.

In some embodiments, referring to FIG. 11, the cross-sectional area of each branch conduit 96, 98 may be uniform/equal as that branch 96, 98 conduit extends longitudinally along at least seventy percent (70%) to eighty percent (80%), or an entirety of, its centerline 108, 122. However, in other embodiments, the cross-sectional area of at least a portion of one or each branch conduit 96, 98 may taper as that branch conduit 96, 98 extends longitudinally along its centerline 108, 122 away from its upstream end 110, 124 as shown, for example, in FIG. 12; see also FIG. 6.

Figure 12:
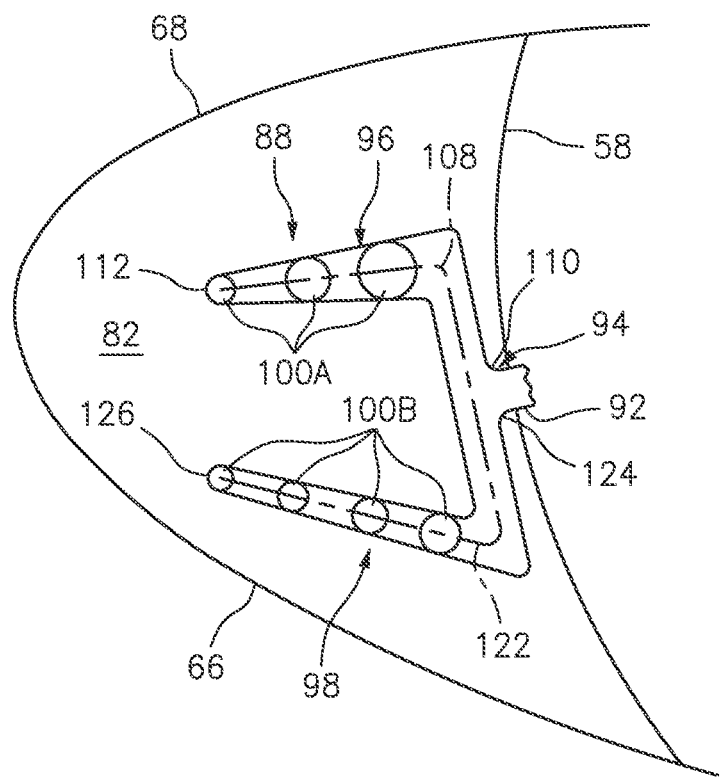
FIG. 12 is a partial side sectional illustration of the aircraft propulsion system assembly with another nozzle for the thermal anti-icing system.

In some embodiments, the first branch centerline 108 may have a non-straight (e.g., curvilinear and/or compound) geometry as shown, for example, in FIGS. 11 and 12.

Figure 13A:
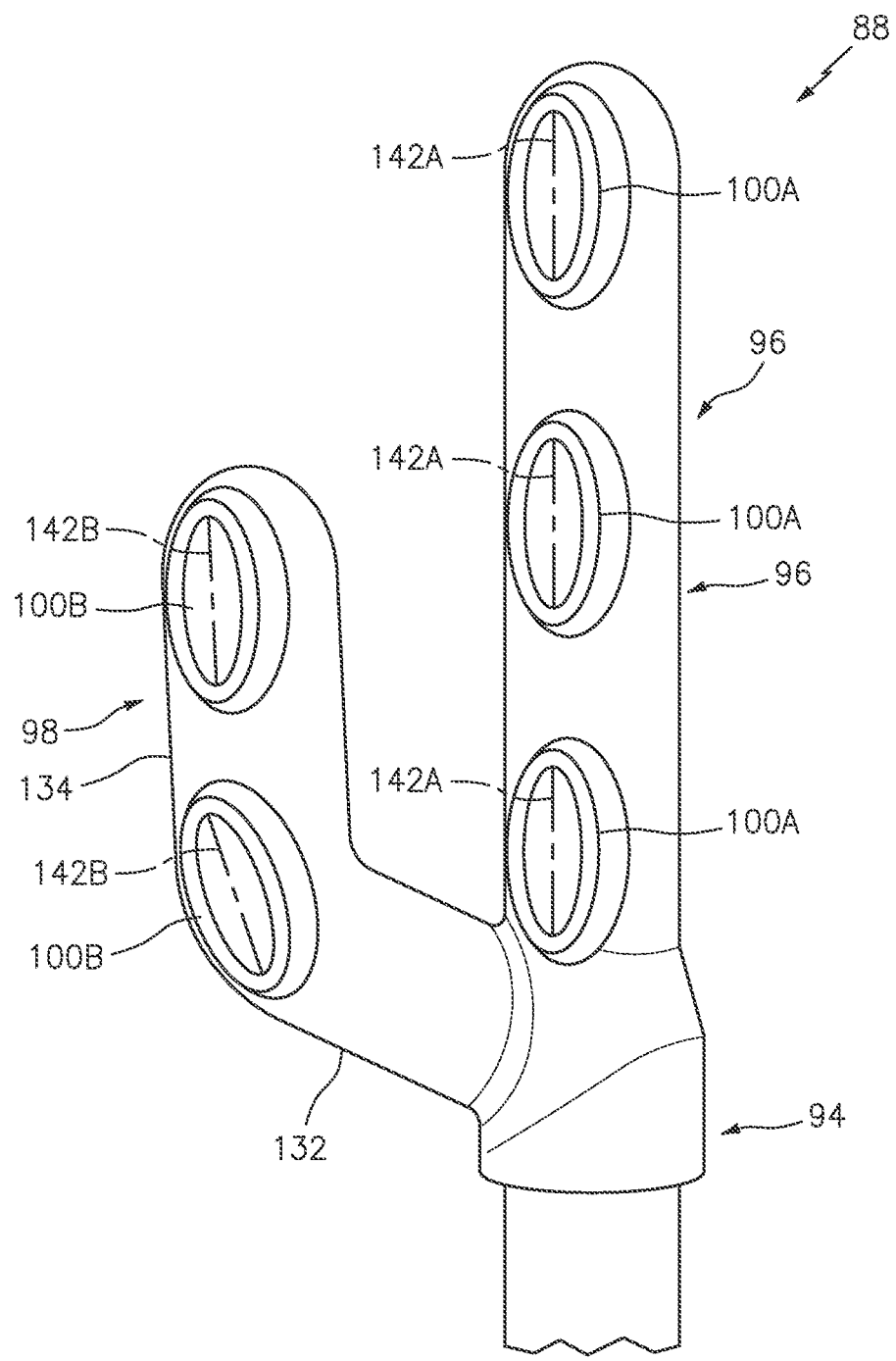
FIG. 13A is a front view illustration of another nozzle for the thermal anti-icing system.
Figure 13B:
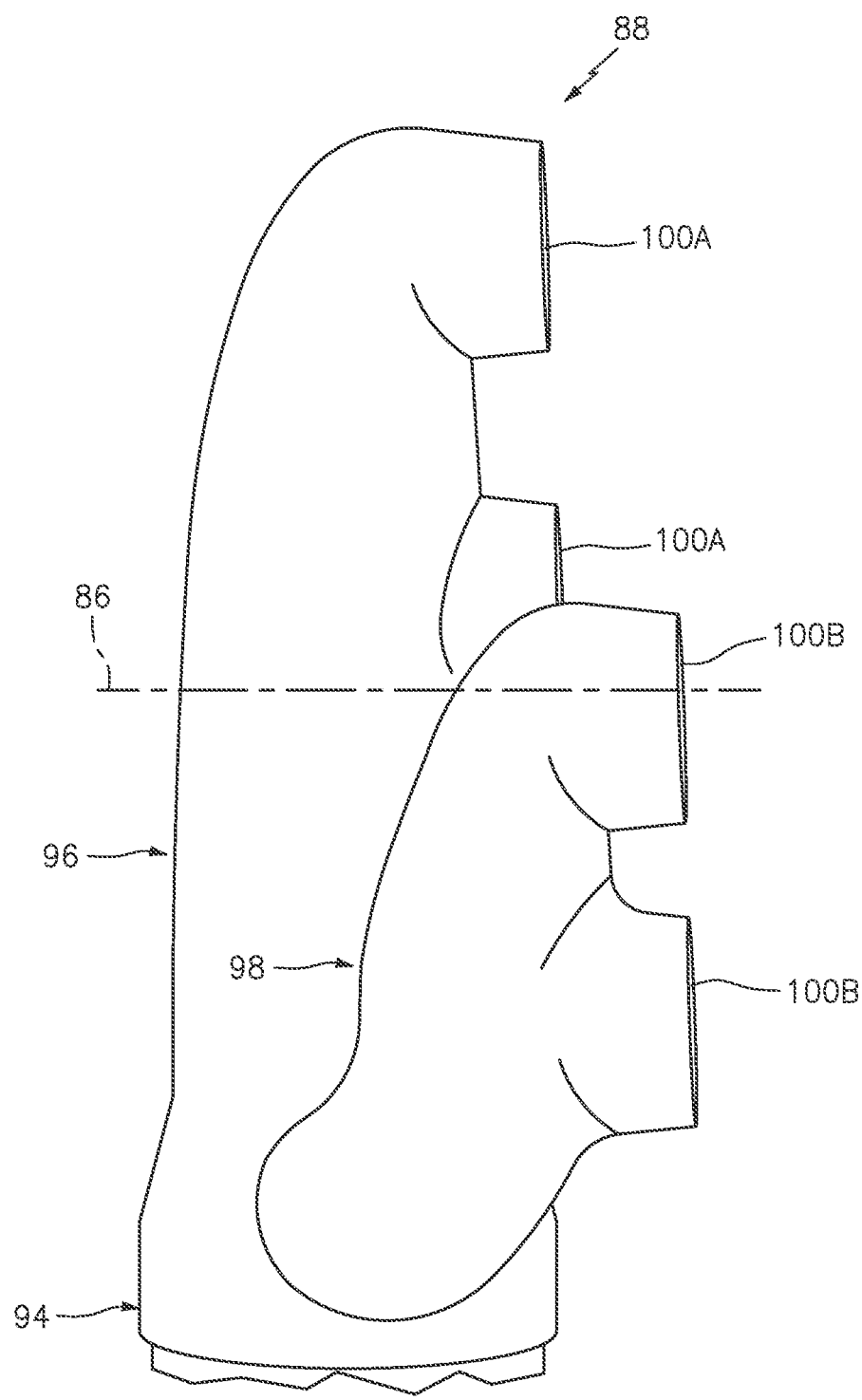
FIG. 13B is a side view illustration of the nozzle of FIG. 13A.

In some embodiments, referring to FIGS. 5 and 6, each of the nozzle ports 100 may be arranged in a common plane; e.g., a plane perpendicular to the rotational axis 26. In other embodiments, referring to FIGS. 13A and 13B, one or more or each of the nozzle ports 100 (e.g., 100A) may be arranged in a different plane from one or more other nozzle ports 100 (e.g., 100B). The second ports 100B of FIG. 13B, for example, are offset (e.g., downstream of) along the curvilinear centerline 86 relative to the first ports 100A.

Figure 9:
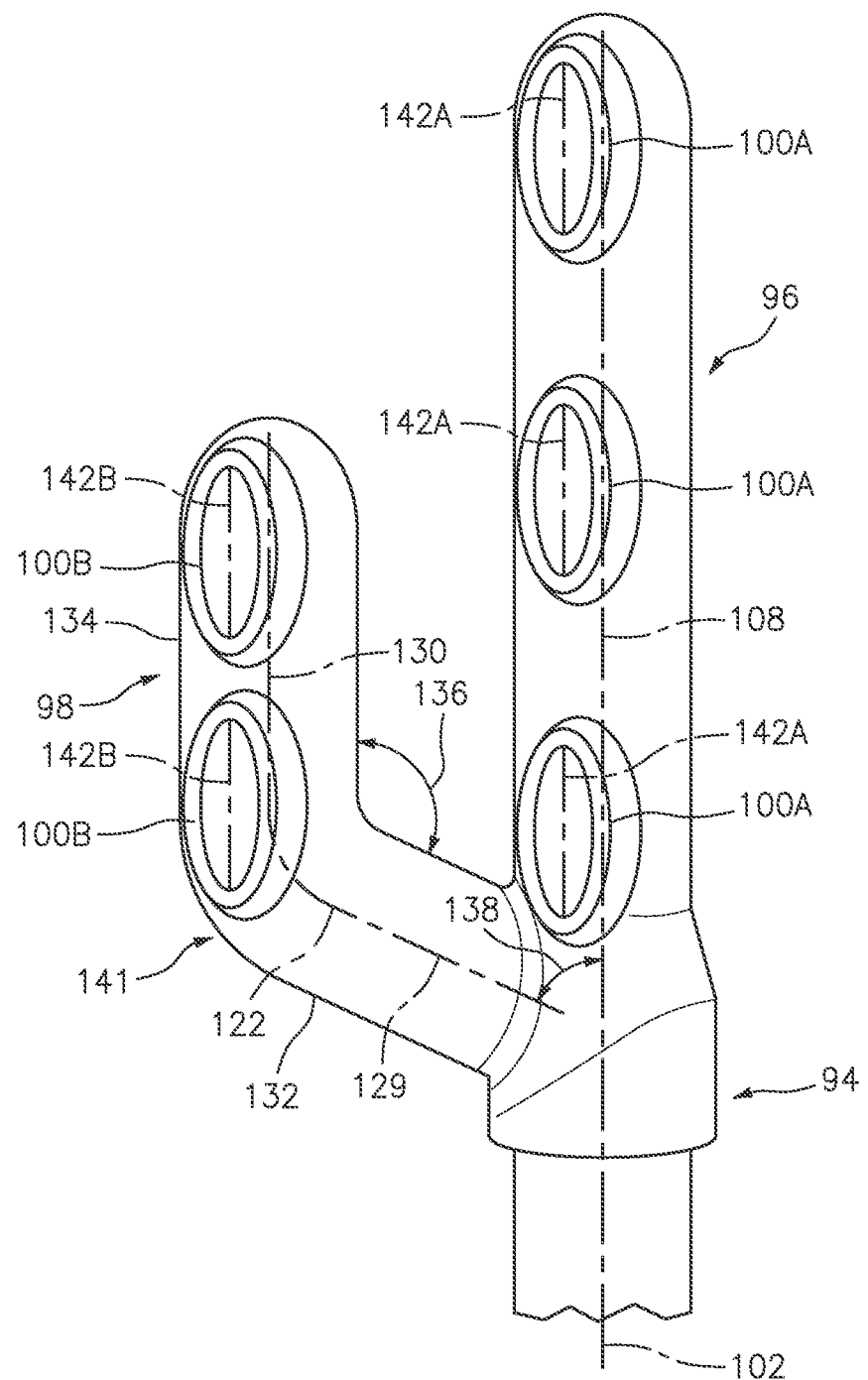
FIG. 9 is a front view illustration of another nozzle for the thermal anti-icing system.

In some embodiments, referring to FIG. 9, major axes 142A and 142B (generally referred to as "142") of the nozzle ports 100 may be parallel with one another. In other embodiments, referring to FIG. 13A, the major axis 142 of at least one (or more) of the nozzle ports 100 may be non-parallel with at least another one of the nozzle ports 100. The second nozzle port 100B' of FIG. 13, for example, is skewed relative to the other nozzle ports 100.

Figure 14A:
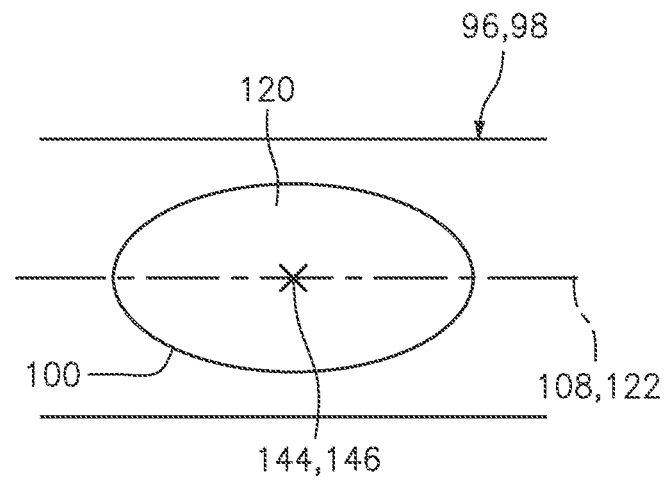
FIGS. 14A and 14B are schematic illustrations depicting different orientations of a nozzle port relative to a centerline of a branch conduit.
Figure 14B:
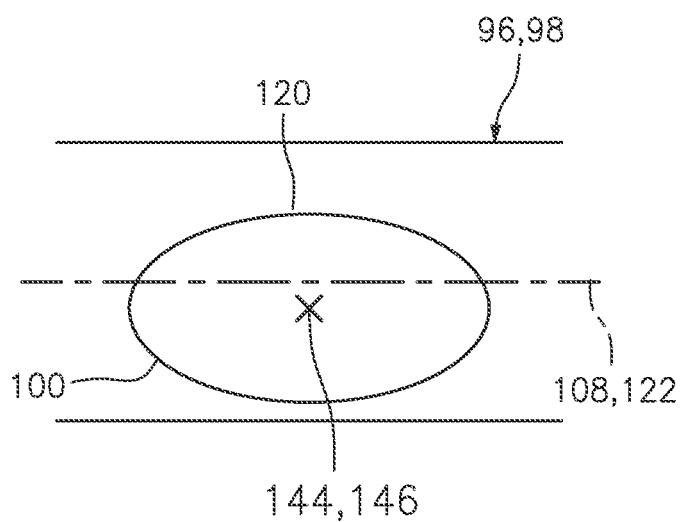

In some embodiments, referring to FIG. 14A, each of the nozzle ports 100 may be aligned with the centerline 108, 122 of the respective branch conduit 96, 98. For example, a center 144 of nozzle port 100 in a normal plane (e.g., a face plane) of the nozzle port 100 may be aligned with the centerline 108, 122. The term "normal plane" may describe a plane that is normal (perpendicular) to a centerline 146 of the nozzle port 120. In the embodiment of FIG. 14A, a plane defined at a distal end face of the nozzle port 100 (i.e., the face plane) is also a normal plane. In other embodiments, referring to FIG. 14B, one or more or each of the nozzle ports 100 may be offset from (e.g., misaligned with) with the centerline 108, 122 of the respective branch conduit 96, 98. For example, the center 144 of the nozzle port 100 in the normal plane of that nozzle port 100 may be misaligned with (e.g., to the left or right of) the centerline 108, 122. The nozzle port 100 may be positioned in order to increase or decrease fluid flow through the respective port 100. For example, by positioning the second port 100B' of FIG. 13A towards the outside of the curve between the first portion 132 and the second portion 134, the second port 100B' may be operable to flow more fluid there through.

In some embodiments, referring to FIGS. 5 and 6, each of the nozzle ports 100 may be tapered. More particularly, the sidewall of each of the nozzle ports 100 may taper inward as the nozzle port 100 projects out from the respective branch conduit 96, 98.

A cross-sectional geometry (e.g., area and/or shape) of each of the nozzle ports 100 and, more particularly, an outlet of each nozzle orifice 120 may be uniform/equal. Thus, the nozzle ports 100 may have equal flow areas. Alternatively, in other embodiments, the outlet area and/or the outlet shape of one of the nozzle ports 100 may be different from the outlet area and/or the outlet shape of another one of the nozzle ports 100.

Figure 15A:
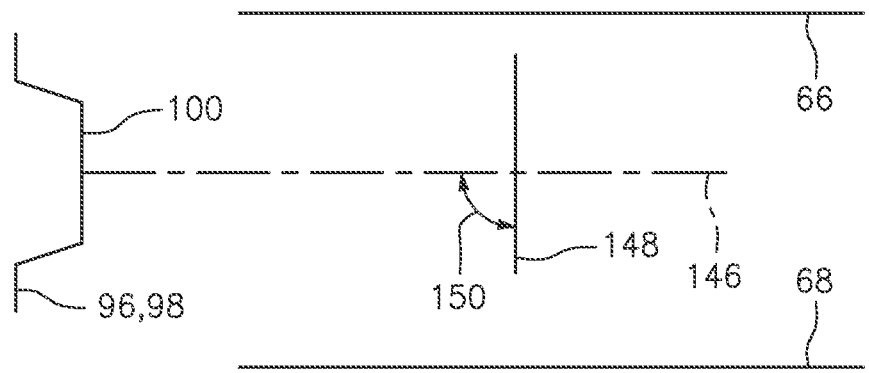
FIGS. 15A-15C are schematic illustrations depicting different orientations of the nozzle port relative to a ray extending from the rotational axis of the aircraft propulsion system.
Figure 15B:
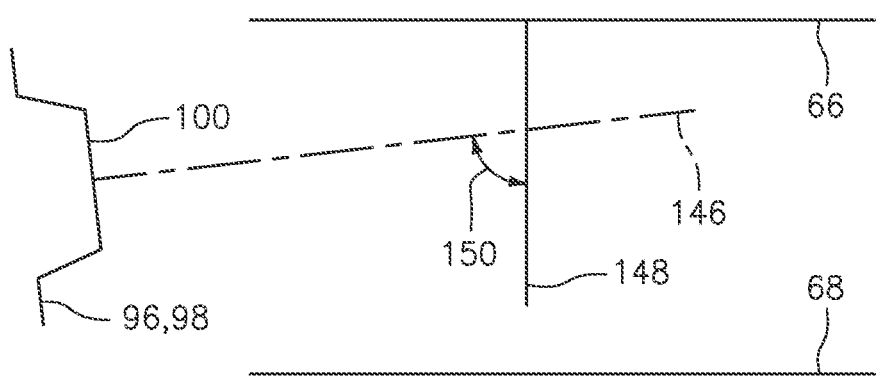
Figure 15C:
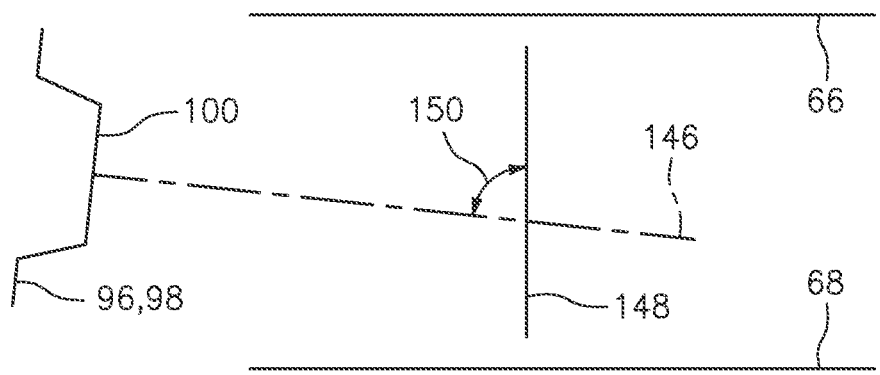

In some embodiments, referring to FIGS. 15A-C, the centerline 146 of each nozzle port 100 is angularly offset from a ray 148 projecting out from the rotational axis 26 (see FIG. 1) by an angle 150. This angle 150 may be a right angle as shown in FIG. 15A. Alternatively, the angle 150 may be an acute angle as shown in FIGS. 15B and 15C. The angle 150, for example, may be less than ninety degrees (90°) and greater than forty-five degrees (45°). In the embodiment of FIG. 15B, the nozzle port 100 is configured such that its centerline 146 is angled towards the inner lip skin 66. In the embodiment of FIG. 15C, the nozzle port 100 is configured such that its centerline 146 is angled towards the outer lip skin 68.

Figure 16A:
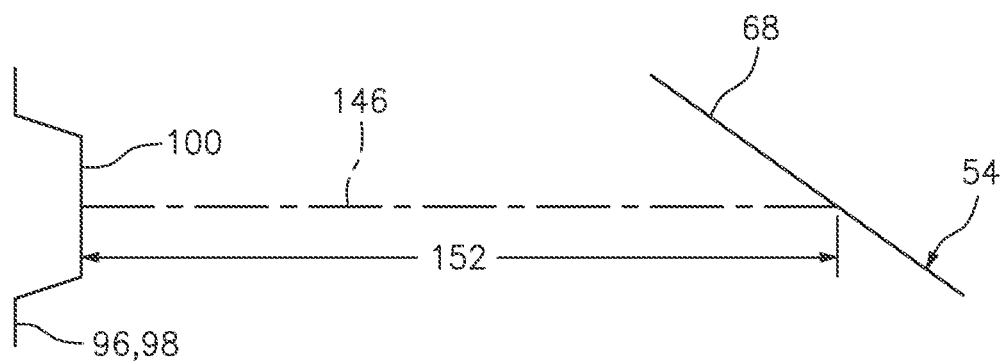
FIG. 16A is a schematic illustration depicting the nozzle port relative to an inlet lip.
Figure 16B:
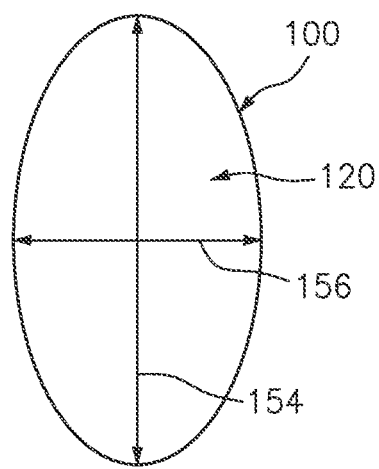
FIG. 16B is a schematic illustration of the nozzle port of FIG. 16A.

Referring to FIG. 16A, each of the nozzle ports 100 is disposed a longitudinal distance (L) 152 along its centerline 146 from the outer lip skin 68. Referring to FIG. 16B, each of the nozzle ports 100 has a flow area with a (e.g., hydraulic) diameter (D); e.g., a major axis diameter 154 or a minor axis diameter 156. Based on the foregoing dimensions, each nozzle port has an L/D factor which is equal to the longitudinal distance (L) divided by the diameter (D) (e.g., 154 or 156). The nozzle 88 may be configured such that the L/D factor for each of the nozzle ports 100 is equal, or substantially equal (e.g., within +/−10%). With such a configuration, hotspots on the lip skin 54 may be minimized. Of course, in other embodiments, the L/D factor of one or more of the nozzle ports 100 may be different.

Figure 17:
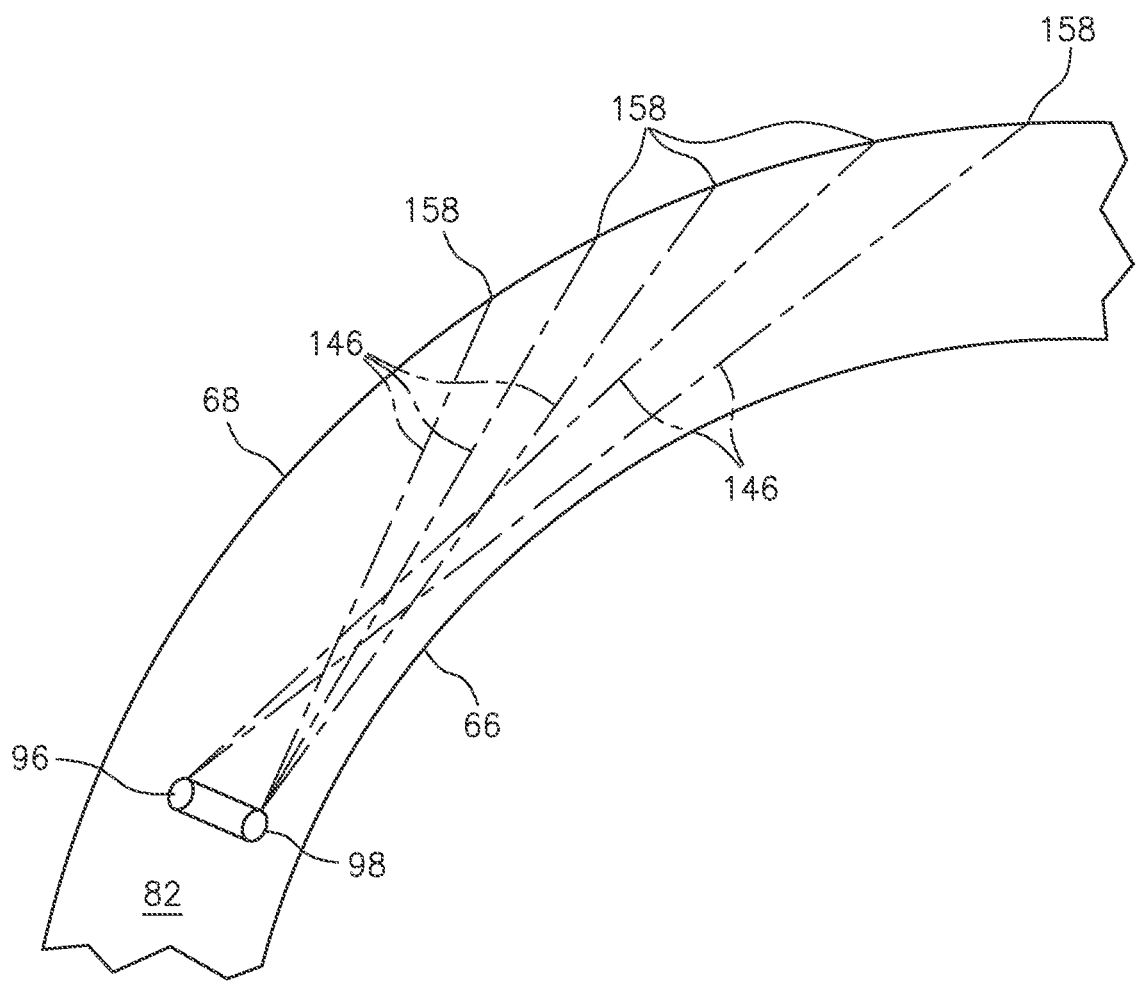
FIG. 17 is a schematic illustration of the nozzle injecting fluid into a cavity of a nacelle inlet structure along nozzle port centerlines.

Referring to FIG. 17, each of the nozzle ports 100 (not visible in FIG. 17) may be configured such that its centerline 146 has a target location 158 on the outer lip skin 68. In some embodiments, the target locations 158 may be different. For example, the first ports 100A may be configured such that their target locations 158 are further away from the nozzle 88 than the target locations 158 of the second ports 100B. With this arrangement, the first ports 100A are aimed more towards the inner lip skin 66 and the second ports 100B are aims more towards the outer lip skin 68. The present disclosure, of course, is not limited to such an exemplary target location pattern.

In some embodiments, referring to FIG. 5, a quantity of the second ports 100B may be less than a quantity of the first ports 100A. In other embodiments, referring to FIG. 11, the quantity of the second ports 100B may be equal to the quantity of the first ports 100A. In still other embodiments, referring to FIG. 12, the quantity of the second ports 100B may be greater than the quantity of the first ports 100A.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle inlet structure with an internal cavity; and
   a nozzle configured to direct fluid into the internal cavity through a plurality of ports that include a plurality of first ports and a second port, the nozzle comprising a trunk conduit, a first branch conduit and a second branch conduit;
   the first branch conduit and the second branch conduit fluidly coupled in parallel to the trunk conduit, the first branch conduit comprising the plurality of first ports, and the second branch conduit comprising the second port;
   wherein the first branch conduit extends out from the trunk conduit along a first branch centerline to a first closed end; and
   wherein the second branch conduit extends out from the trunk conduit along a second branch centerline to a second closed end.

2. The assembly of claim 1, wherein at least a first portion of the first branch centerline is parallel with at least a second major portion of the second branch centerline.

3. The assembly of claim 1, wherein the first branch centerline is coaxial with a trunk centerline of the trunk conduit at least at an interface between the first branch conduit and the trunk conduit.

4. The assembly of claim 1, wherein the second branch centerline is angularly offset from a trunk centerline of the trunk conduit by an angle at least at an interface between the second branch conduit and the trunk conduit.

5. The assembly of claim 1, wherein
   the second branch conduit includes a first portion and a second portion;
   the first portion connects the second portion to the trunk conduit; and
   the second portion is angularly offset from the first portion by an angle.

6. The assembly of claim 1, wherein
   the first branch conduit has a first longitudinal length; and
   the second branch conduit has a second longitudinal length that is less than the first longitudinal length.

7. The assembly of claim 1, wherein
   the nacelle inlet structure comprises an inner lip skin; and
   the second branch conduit is located radially between the first branch conduit and the inner lip skin relative to an axis of the nacelle inlet structure.

8. The assembly of claim 1, wherein
   the first branch conduit has a first cross-sectional area at a first interface between the first branch conduit and the trunk conduit;
   the second branch conduit has a second cross-sectional area at a second interface between the second branch conduit and the trunk conduit; and
   the first cross-sectional is greater than the second cross-sectional area.

9. The assembly of claim 1, wherein
   the nacelle inlet structure extends circumferentially around an axis; and
   an angle between a centerline of one of the plurality of ports and a ray extending out from the axis is an acute angle.

10. The assembly of claim 1, wherein
    the nacelle inlet structure extends circumferentially around an axis; and
    an angle between a centerline of one of the plurality of ports and a ray extending out from the axis is a right angle.

11. The assembly of claim 1, wherein each of the plurality of ports has an equal flow area.

12. The assembly of claim 1, wherein one of the plurality of ports has a different flow area than another one of the plurality of ports.

13. The assembly of claim 1, wherein
    the first branch conduit includes a first quantity of the plurality of ports; and the second branch conduit includes a second quantity of the plurality of ports that is different than the first quantity of the plurality of ports.

14. The assembly of claim 1, wherein the second port is one of a plurality of second ports configured with the second branch conduit.

15. The assembly of claim 1, wherein a port centerline of the second port is not coincident with a second branch centerline of the second branch conduit.

16. An assembly for an aircraft propulsion system, comprising:
a nacelle inlet structure with an internal cavity; and
a nozzle configured to direct fluid into the internal cavity through a plurality of ports that include a plurality of first ports and a second port, the nozzle comprising a trunk conduit, a first branch conduit and a second branch conduit;
the first branch conduit and the second branch conduit fluidly coupled in parallel to the trunk conduit, the first branch conduit comprising the plurality of first ports, and the second branch conduit comprising the second port;
wherein a first of the plurality of ports has a first diameter and a first distance to an outer lip skin of the nacelle inlet structure;
wherein a second of the plurality of ports has a second diameter and a second distance to an outer lip skin of the nacelle inlet structure;
wherein the first distance is different than the second distance; and
wherein a first quotient of the first distance divided by the first diameter is substantially equal to a second quotient of the second distance divided by the second diameter.

17. An assembly for an aircraft propulsion system, comprising
a nacelle inlet structure with an internal cavity; and
a nozzle configured to direct fluid into the internal cavity through a plurality of ports;
a first of the plurality of ports having a first flow area with a first diameter and located a first distance to an outer lip skin of the nacelle inlet structure along a first port centerline;
a second of the plurality of ports having a second flow area with a second diameter and located a second distance to the outer lip skin of the nacelle inlet structure along a second port centerline, the first distance different than the second distance; and
a first quotient of the first distance divided by the first diameter is substantially equal to a second quotient of the second distance divided by the second diameter.

18. The assembly of claim 17, wherein
the nozzle includes a trunk conduit, a first branch conduit and a second branch conduit;
the first branch conduit and the second branch conduit are fluidly coupled in parallel to the trunk conduit;
the first branch conduit includes the first of the plurality of ports; and
the second branch conduit includes the second of the plurality of ports.

\* \* \* \* \*